US006791606B1

(12) United States Patent
Miyano (10) Patent No.: US 6,791,606 B1
(45) Date of Patent: Sep. 14, 2004

(54) AUTO WHITE BALANCING APPARATUS AND METHOD

(75) Inventor: Toshiki Miyano, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/567,641

(22) Filed: May 9, 2000

(51) Int. Cl.[7] .............................................. H04N 9/73
(52) U.S. Cl. ............................... 348/223.1; 348/225.1; 348/228.1
(58) Field of Search ........................ 348/223.1, 225.1, 348/228.1, 655, 227.1, 266

(56) References Cited

U.S. PATENT DOCUMENTS

| | | | | | |
|---|---|---|---|---|---|
| 5,485,202 | A | * | 1/1996 | Ueda | 348/223.1 |
| 5,644,359 | A | * | 7/1997 | Ito | 348/223.1 |
| 5,654,753 | A | * | 8/1997 | Takei | 348/223.1 |
| 5,659,357 | A | * | 8/1997 | Miyano | 348/223.1 |

FOREIGN PATENT DOCUMENTS

| | | | | | |
|---|---|---|---|---|---|
| JP | 5-292533 | | 11/1993 | | |
| JP | 07143513 | A * | 6/1995 | ............ | H04N/9/73 |
| JP | 08186828 | A * | 7/1996 | ............ | H04N/9/04 |
| JP | 8-289314 | | 11/1996 | | |
| JP | 08289314 | A * | 11/1996 | ............ | H04N/9/73 |

* cited by examiner

Primary Examiner—Wendy R. Garber
Assistant Examiner—Lin Ye (74) Attorney, Agent, or Firm—Pamela R. Crocker (57) ABSTRACT

An auto white balancing apparatus includes a block split circuit for splitting an image into a plurality of blocks; a representative color calculating circuit which for each split block, derives a representative color of each block on the basis of pixel values within each block; and a block reliability estimating circuit which for each block and for each light source determines the distance between color difference components of the color of a white object under each light source and color difference components of the representative color of each block, to thereby estimate a reliability signal with which each light source lights a scene of each block on the basis of the distances. The auto white balancing apparatus also includes a light source contribution component estimating circuit which for each light source, weights and averages the representative color of each block in accordance with the reliability signal of each light source upon each block, to thereby estimate components of contribution of each light source to the entire image; and a total reliability estimating circuit which for each light source, totals up the reliability signal of each light source upon each block over all blocks contained within the image, to thereby estimate the reliability signal of each light source in the entire image. The auto white balancing apparatus further includes a lighting color estimating circuit for weighting and averaging components of contribution of each light source to the entire image estimated by the light source contribution component estimating circuit, in accordance with the reliability signal of each light source upon the entire image estimated by the total reliability estimating circuit, to thereby estimate the color of lighting which lights the scene of the entire image; and a white balancing circuit for executing white balance processing of each pixel of the image so as to cancel the lighting color estimated.

4 Claims, 6 Drawing Sheets

AUTO WHITE BALANCING APPARATUS AND METHOD

BACKGROUND OF THE INVENTION

1. Field of the Invention

The present invention relates to an auto white balancing apparatus for use in electronic still cameras, video cameras or the like.

2. Description of the Related Art

Video cameras and digital still cameras have employed auto white balancing adjustment with the aim of reproducing a white subject so that it looks white. Conventional well-known auto white balancing methods include adjusting the balance of RGB components (the three primary color components consisting of red, green and blue) of each pixel signal in order to render the average of the entire image into an achromatic color. This method, however, has entailed a drawback that improper white balancing adjustment may often be made in the case where chromatic colors occupy the major part of an image.

Such improper white balancing adjustment is called a color failure. Known as the auto white balance adjusting method for alleviating this color failure is a technique disclosed in Japan Patent Laid-open Pub. No. Hei 5-292533. In this technique, the image is split into a plurality of blocks, the RGB average values of each block are derived, and only those blocks are extracted whose average values lie in predetermined ranges. Adjustment of the RGB components is then made so as to ensure that the RGB average values of the thus extracted blocks result in an achromatic color.

Although these methods have presented an effect in the case of the presence of a limited number of light sources lighting a subject, they have failed to provide a sufficient white balancing adjustment in the event of being lighted by an unassumed light source or of simultaneous lighting by a plurality of different light sources.

The applicant has thus proposed an improved auto white balance adjuster disclosed in Japan Patent Laid-open Pub. No. Hei 8-289314. The adjuster splits an image into a plurality of blocks and extracts a block group judged to represent a white object photographed under a fluorescent light, a block group judged to represent the white object photographed under the sunlight or tungsten light, and a block group having a color closer to the brightest block within the image. The average value of each of the RGB components is then figured out for each block group, and the average values are intermingled with one another in compliance with a predefined rule so that the resultant value is used as the white balance adjustment signal. This adjuster allows the RGB average values of the block group of color closer to the brightest block within the image to reflect on the white balance signal, whereupon a proper white balance adjustment can be made even under the unassumed light source or under a plurality of different light sources.

The above conventional method has suffered from a problem that the white balance behavior is apt to become unstable due to the change of the photographed scenes since use is made of the result of binary discrimination of whether the average values of the color difference of each block lie in a region (light source region) fixedly defined for each light source. For example, a slight change in the photographed scene may possibly cause a block which has belonged to a particular light source region so far to deviate from that light source region, with the danger that such an abrupt binary change may possibly bring about an unstable white balance.

SUMMARY OF THE INVENTION

The present invention was conceived in order to solve this problem. It is therefore the object of the present invention to provide an auto white balancing apparatus ensuring a stabilized white balance adjustment.

According to an aspect of the present invention there is provided an auto white balancing apparatus comprising block split means for splitting an image to be subjected to white balance processing into a plurality of blocks; representative color calculating means which for each split block, derives a representative color of the each block on the basis of pixel values within the each block; block reliability estimating means which for the each block and for each light source assumed, determines the distance between color difference components of the color of a white object under the each light source and color difference components of the representative color of the each block, to thereby estimate a reliability with which the each light source lights a scene of the each block on the basis of the distances; light source contribution component estimating means which for each light source, weights and averages the representative color of each block in accordance with the reliability of the each light source in each block, to thereby estimate components of contribution of each light source to the entire image; total reliability estimating means which for each light source, totals up the reliability of each light source in each block over all blocks contained within the image, to thereby estimate the reliability of each light source upon the entire image; lighting color estimating means for weighting and averaging components of contribution of each light source to the entire image estimated by the light source contribution component estimating means, in accordance with the reliability of each light source in the entire image estimated by the total reliability estimating means, to thereby estimate the color of lighting which lights the scene of the entire image; and white balancing means for executing white balance processing of each pixel of the image so as to nullify the lighting color estimated.

This apparatus performs the white balance adjustment using the reliability obtained from the distance between the color difference of the block representative color and the typical color difference of each light source, in lieu of using the result of binary discrimination of whether each optical region contains an average value of the color differences of blocks. The distance between the two color difference values are given as continuous values. The white balance adjustment processing in accordance with the present invention thus enables the behavior of the white balance to continuously follow any change of scenes photographed, achieving a smoother white balance adjustment than the prior art making adjustment based on the result of binary discrimination.

Preferably, the apparatus of the present invention further comprises means for modifying the reliability estimated by the block reliability estimating means, in accordance with luminance components of the representative color of the each block.

Different brightness of scenes offers different degree of reflection of lighting color upon the colors of those scenes. This aspect enables the reliability with which each light source lights the scene to be modified in response to the brightness, i.e., luminance of the scene, whereby improvement is achieved in the accuracy of estimation of the lighting color and, as the result of this, improvement is also achieved in the accuracy of the white balance adjustment.

In this aspect, modification of the reliability may be made using a function prepared separately for each light source so that the reliability with which each light source lights the scene can be modified utilizing knowledge about the brightness of each light source. Furthermore, the function for use in the modification may be a continuous function whose value varies continuously with respect to the luminance so that a smooth white balance adjustment can be realized.

According to another aspect of the present invention, the direct sunlight in the daytime and the shade-light in the daytime are distinguished from each other as different light sources whereby it is possible to provide a flexible white balance control even though the image contains both the portions subjected to direct sunlight and the portions in the shade.

DESCRIPTION OF THE PREFERRED EMBODIMENT

The present invention will now be described with reference to the accompanying drawings which illustrate a presently preferred embodiment thereof in a non-limitative manner.

Figure 1:
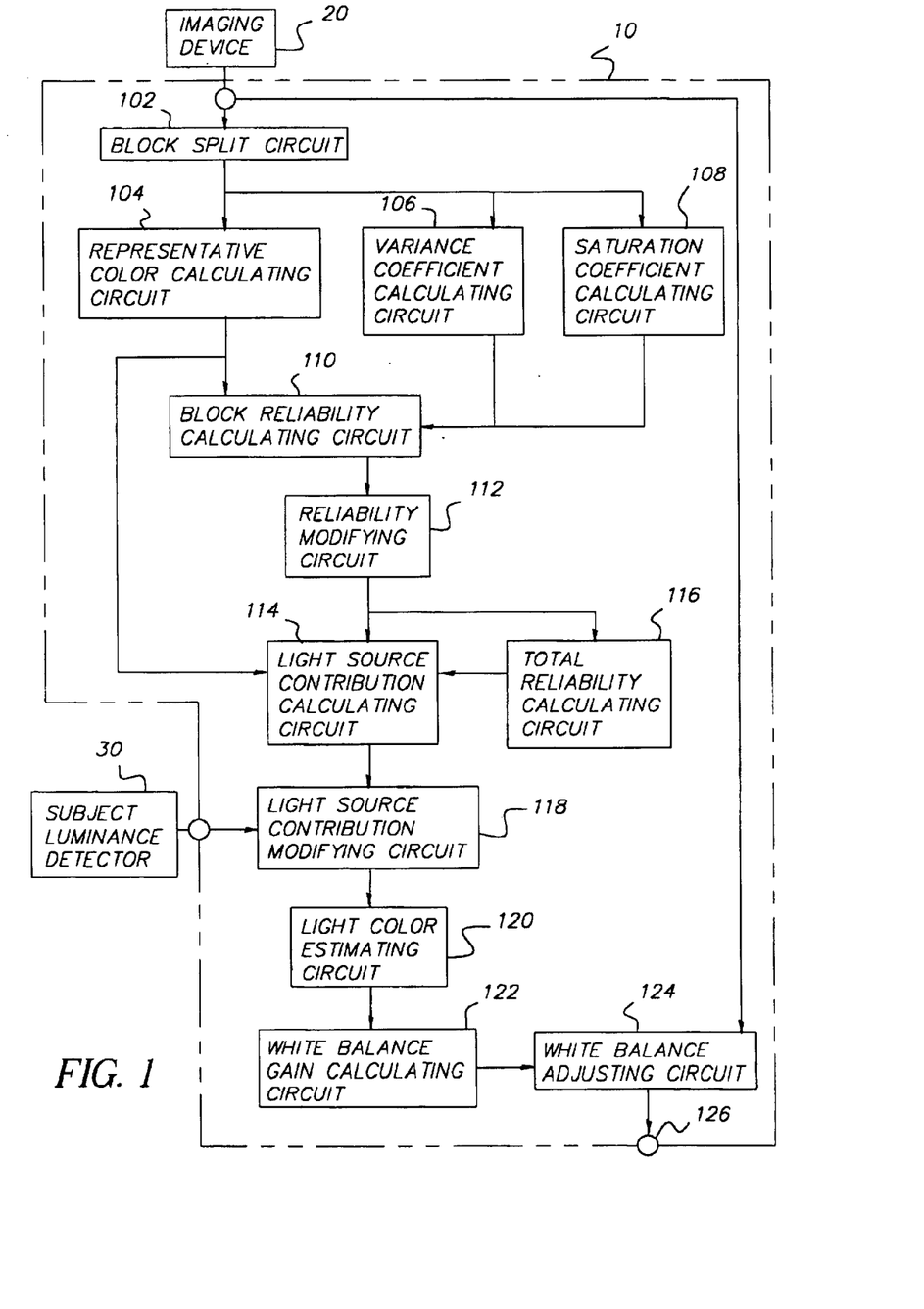
FIG. 1 shows the configuration of an auto white balancing apparatus in accordance with an embodiment of the present invention.

FIG. 1 is a function block diagram showing the configuration of an auto white balancing apparatus 10 in accordance with an embodiment of the present invention. The auto white balancing apparatus 10 is typically incorporated into a camera such as an electronic still camera or a video camera. The auto white balancing apparatus 10 generates a white balance control signal from an image signal fed from an imaging device 20 of the camera. Using the control signal the auto white balancing apparatus 10 imparts a white balance control to the image signal for the output. In this embodiment, estimation is made of the color of a light source (referred to as lighting color) lighting up scenes of images so that a white balance control is provided on the basis of the result of this estimation.

Figure 2:
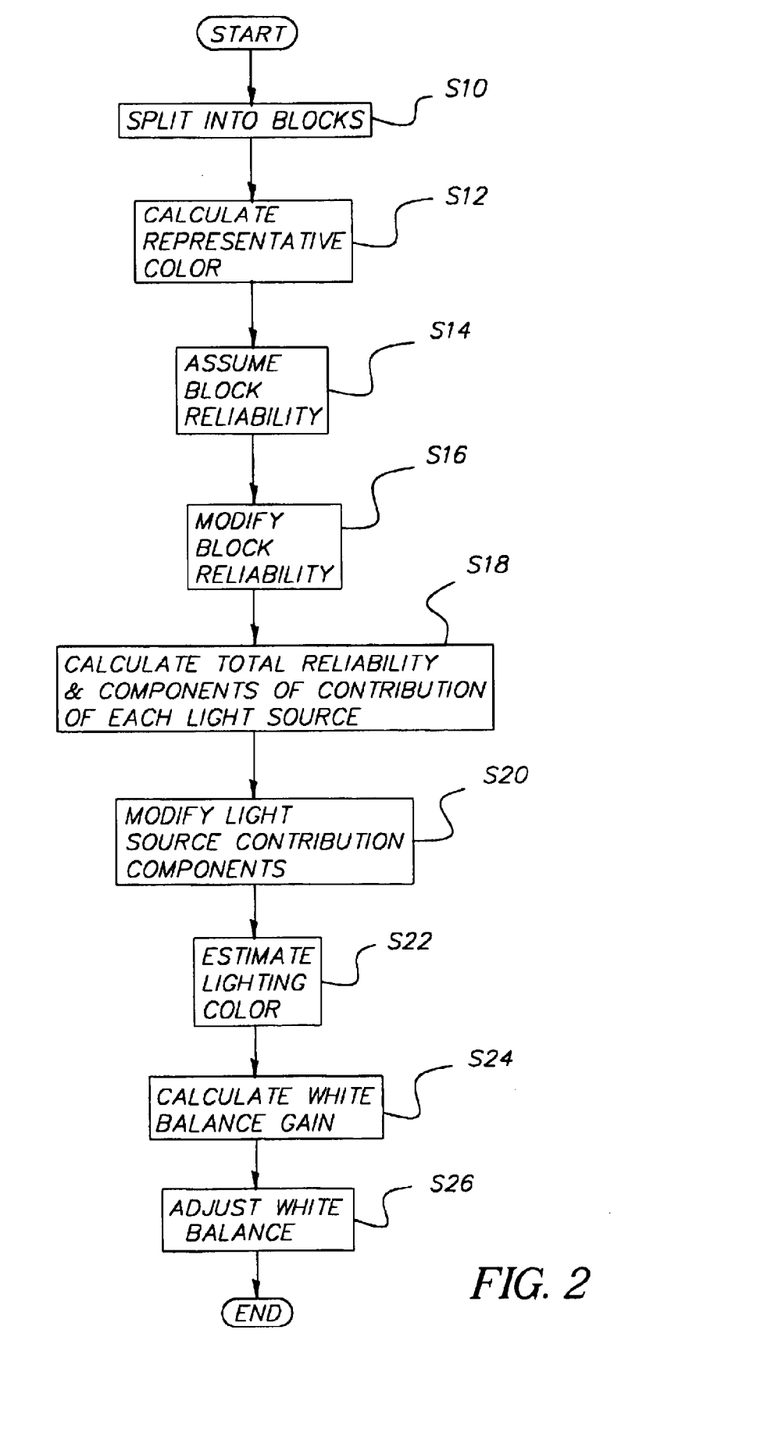
FIG. 2 shows the procedure of processing effected by the auto white balancing apparatus of the embodiment.

FIG. 2 is a flowchart showing a procedure of processing operations effected by this auto white balancing apparatus.

Referring to FIGS. 1 and 2, detailed description will hereinafter be given of the detailed configuration of the auto white balancing apparatus 10 and of the content of the processing operations.

Figure 3:
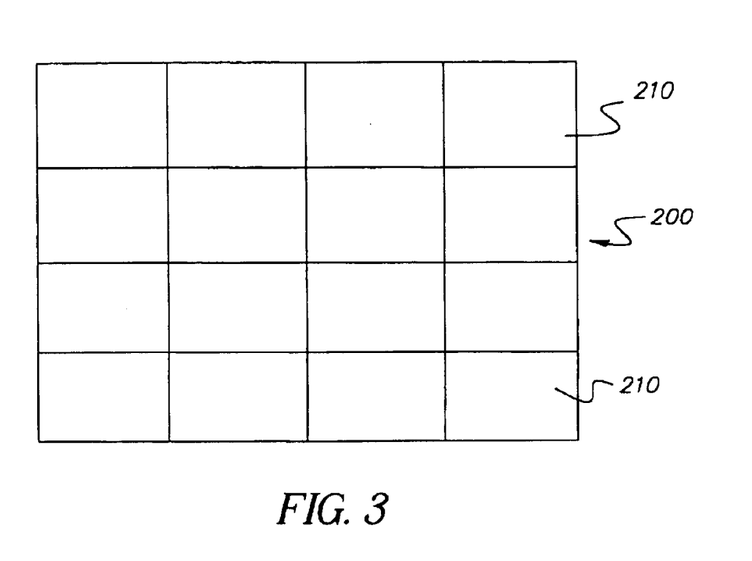
FIG. 3 is a diagram showing an example of block splitting.

The image signal output from the imaging device 20 is split into a plurality of blocks by a block split circuit 102 (S10). FIG. 3 depicts an example of the image block splitting. In this example, a one-frame image 200 is split into sixteen (4×4=16) blocks 210 each consisting of m×m pixels. The block splitting of FIG. 3 is merely shown by way of example, and other splitting methods may naturally be employed. Image data on each block obtained as a result of splitting by the circuit 102 are fed to a representative color calculating circuit 104, a variance coefficient calculating circuit 106, a saturation coefficient calculating circuit 108 and a light source contribution calculating circuit 114.

The representative color calculating circuit 104 derives representative color of each block which is an average color of the block, from the image data on each block (S12). The detailed contents of processing operations effected by this circuit 104 are as follows. That is, the representative color calculating circuit 104 first finds an average value of pixel values of all pixels contained in one block. Provided that image signals of the imaging device 20 are represented by RGB (red, green, blue), the representative color calculating circuit 104 averages RGB values of all the pixels in that block for each component of the RGB. The thus obtained averages (R, G, B) represent a representative color of that block. The representative color calculating circuit 104 then linearly converts the average values (R, G, B) into a combination (L, u, v) of luminance (L) and two color difference components (u, v). This conversion is given by the following expression.

$$\begin{pmatrix} L \\ u \\ v \end{pmatrix} = \begin{pmatrix} 1/4 & 1/2 & 1/4 \\ -1/4 & 1/2 & -1/4 \\ -1/2 & 0 & 1/2 \end{pmatrix} \begin{pmatrix} R \\ G \\ B \end{pmatrix} \qquad \text{[Expression 1]}$$

It is to be understood that the conversion matrix for use in the conversion depends on the input color characteristics of the imaging device 20 and that the expression (1) is merely given by way of example. In the event that the image signals are represented by a calorimetric system other than RGB, use is made of a conversion matrix in compliance with the calorimetric system to derive the luminance and the color difference components. In the above processing, all the pixels in one block have been averaged for the acquisition of the block representative color, but instead averaging may be made of pixels extracted from the block pixels in accordance with a predetermined sampling rule.

Such processing is carried out for each of blocks constituting one image. The thus obtained luminance and color difference representation (L, u, v) of the representative color of each block is fed to a block reliability calculating circuit 110. Hereinafter, let i be a block identification number (i=1, 2, ... , n: n is the number of all blocks contained in one image) so that the representative color of an i-th block (referred to as a block i) is represented as (Li, ui, vi).

Concurrently with the above processing of the representative color calculating circuit 104, the variance coefficient calculating circuit 106 and the saturation coefficient calculating circuit 108 execute their respective processing operations.

Figure 4:
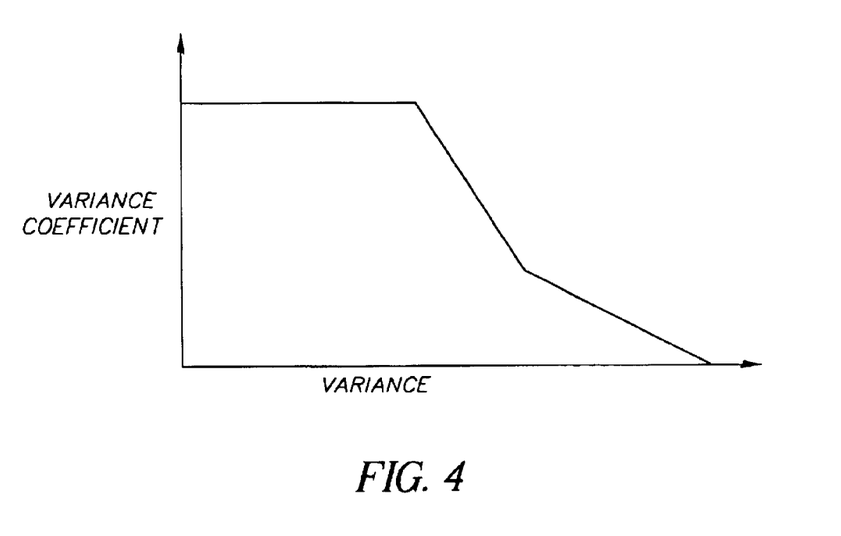
FIG. 4 illustrates an exemplary function for determining a variance coefficient.

The variance coefficient calculating circuit 106 accepts image data on each block and figures out a variance coefficient Cv on a block-to-block basis. The variance coefficient Cv is a coefficient for the correction of a block reliability which will be described later, and it is determined depending on the variance of pixel values in that block. The variance coefficient of the block i is represented as Cvi. The variance coefficient calculating circuit 106 first samples pixels from a block pixel group by means of a predetermined method and then finds a variance of pixel values of the thus sampled pixels. In this case, the circuit 106 figures out a variance of the sampled pixels for each of components R, G, B to find a general variance value through, e.g., averaging of the variances for the respective components. The variance coefficient calculating circuit 106 then calculates a variance coefficient on the basis of the thus obtained variance value. The variance coefficient Cv is found by use of a previously prepared function. FIG. 4 is a graphic representation of an example of this function. As is apparent from FIG. 4, the circuit 106 uses a function allowing the variance coefficient to become smaller accordingly as the variance value increases. This function is registered in advance in the circuit 106, for example.

Figure 5:
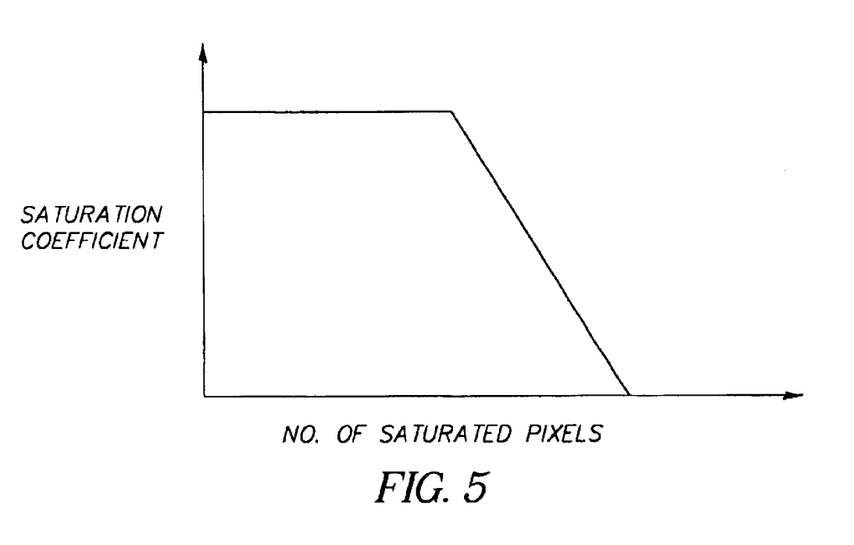
FIG. 5 illustrates an exemplary function for determining a saturation coefficient.

The saturation coefficient calculating circuit 108 accepts image data on each block and derives a saturation coefficient Cs on a block-to-block basis. The saturation coefficient Cs is a coefficient for the correction of the block reliability which will be described later, and it is determined depending on the number of saturated pixels in that block. The saturated pixel is a pixel whose pixel value has reached its upper limit (e.g., 255 in 8-bit representation) with respect to at least one component (e.g., R, G or B). The saturation coefficient of the block i is represented as Csi. The saturation coefficient calculating circuit 108 first counts up the number of saturated pixels within the block and derives a saturation coefficient from the result of this count. The saturation coefficient Cs is found by use of a previously prepared function. FIG. 5 is a graphic representation of an example of this function. As is apparent from FIG. 5, the circuit 108 uses a function allowing the saturation coefficient to become smaller accordingly as the number of saturated pixels increases. The function used herein is previously registered in the circuit 108 for example.

A reliability modifying circuit 112 accepts the variance coefficient and the saturation coefficient obtained respectively in the variance coefficient calculating circuit 106 and the saturation coefficient calculating circuit 108.

After the acquisition of the luminance and color difference representation (L, u, v) of the block representative color by the representative color calculating circuit 104, for each of previously assumed light sources the block reliability calculating circuit 110 derives a reliability (referred to as a block reliability) with which each light source will light that block (S14). The block reliability of a block is derived for each of the assumed light sources. The processing of S14 will hereinafter be described in greater detail.

This embodiment assumes the light sources to be sunlight, a tungsten light (e.g., incandescent light) and a fluorescent light. These are commonly used as lighting sources in photographing or videotaping by general users. Although the prior art disclosed in the aforementioned Japanese Patent Laid-open Pub. No. Hei 8-289314 handled the sunlight and the tungsten light collectively, this embodiment handles these lights separately. This permits white processing which better reflects a difference between the sunlight and the tungsten light.

Furthermore, this embodiment separates the sunlight into daylight (light in the sun in the daytime) and shade-light (light in the shade in the daytime). In spite of similar influences of the sunlight, being in the sun is different from being in the shade in that the former has a relatively low color temperature (reddish) but that the latter offers a relatively high color temperature (bluish). Accordingly, the collective handling of the two may possibly result in an insufficient white balance both in the sun and in the shade. Furthermore, flexible white balance control may become difficult to provide in a scene where portions in the sun and portions in the shade are present in an intermingled manner.

This embodiment thus solves such a problem by handling the daylight and the shade-light separately. This embodiment eventually assumes four different light sources including daylight, shade-light, the tungsten light and the fluorescent light.

For each of the thus assumed light sources, the block reliability calculating circuit 110 figures out a distance D between a color difference component of the color of a white object under that light source (hereinafter, referred to as "a typical color difference" of that light source) and the color components (u, v) of the block representative color. Herein, let j be an identification number of the light source (j=1, 2, ..., m: m is the number of the assumed light sources, m=4 in this embodiment) so that the light source having the identification number j is represented as a light source j. Herein, for convenience, light sources 1, 2, 3 and 4 are daylight, shade-light, tungsten light and fluorescent light, respectively. The following expression is used to find the distance Dij between the color difference components (ui, vi) of the representative color of the block i and the typical color difference (Uj, Vj) of the light source j.

$$Dij = d11*(ui-Uj)^2 + d12*(ui-Uj)*(vi-Vj) + d22*(vi-Vj)^2 \quad (2)$$

where d11, d12 and d22 are predetermined constants. Any combination of the constants d11, d12 and d22 is selected in accordance with characteristics of each light source so that it is possible to define an appropriate distance suitable for the light source characteristics. In this case, values of the constants are previously determined from experiment, for example, for each light source and are stored in a storage unit (such as a ROM not shown) provided in the block reliability calculating circuit 110 or the camera. Other expressions than the above expression (2) could also be used for the definition of the distance. In such a case, different expressions for defining the distance may also be used depending on the characteristics of each light source.

The above calculation of the distance D is carried on all the assumed light sources j for each block i.

The block reliability calculating circuit 110 then derives a reliability Rdij with which the light source j will light the block i, from the thus determined distance Dij. This reliability Rdij is a reliability from the viewpoint of the color differences. The reliability Rdij is obtained from the distance Dij by using a predefined function f. Different light sources can offer different relationships between the distance D and the reliability Rd, so that it is preferred that the function f be prepared individually for each of the light sources j. Let fj represent a reliability function of the light source j, then the reliability Rdji with which the light source j will light the block i is derived from $$Rdij = fj(Dij) \quad (3)$$

Figure 6:
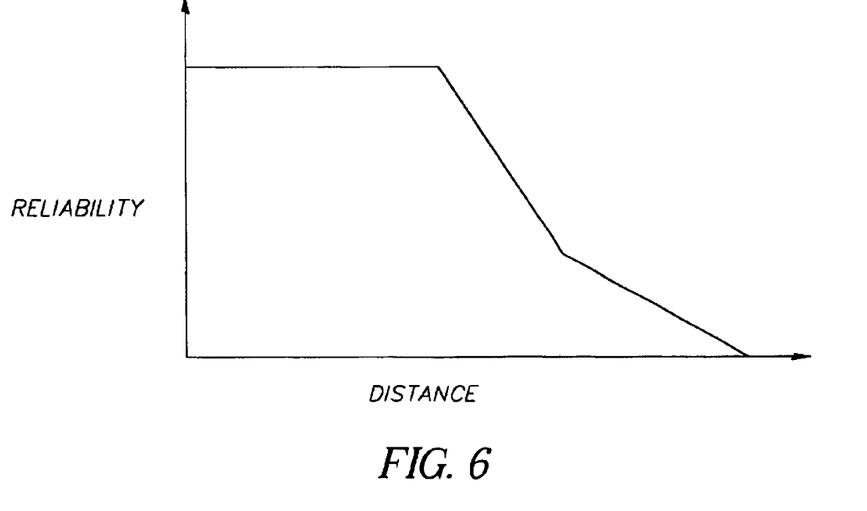
FIG. 6 illustrates an exemplary function for determining a block reliability.

FIG. 6 illustrates an example of the reliability function fj. As can be seen in FIG. 6, the function fj allows its value to become smaller accordingly as the distance Dij increases. By rendering this function into one varying continuously with respect to the distance, it is possible to obviate the problem of the prior art arising from reliance on the results of binary discrimination. The reliability function fj for each light source is previously determined from experiment, for example, and is stored within the apparatus.

From the viewpoint of the luminance, the block reliability calculating circuit 110 modifies the thus obtained reliability Rd based on the color differences. The reason for this is that a difference arises among the distribution of brightness of a white object under the fluorescent light, the distribution of brightness of a white object under direct sunlight (daylight) and the distribution of brightness of a white object in the shade. It is therefore possible to find a possibility that the block i will be lighted by the light source j, in response to the luminance (brightness) of the block i. Herein, this possibility is used as a coefficient to modify the previously obtained color difference based reliability Rd.

For this reason, the block reliability calculating circuit 110 derives, for each block i, a luminance coefficient Clij indicative of a possibility that the block i will be lighted by the light source j from the viewpoint of the luminance. The luminance coefficient Clij is obtained by applying the luminance Li of the block i to a function gj predefined for each light source j. That is, $$Clij = gj(Li) \quad (4)$$

Figure 7:
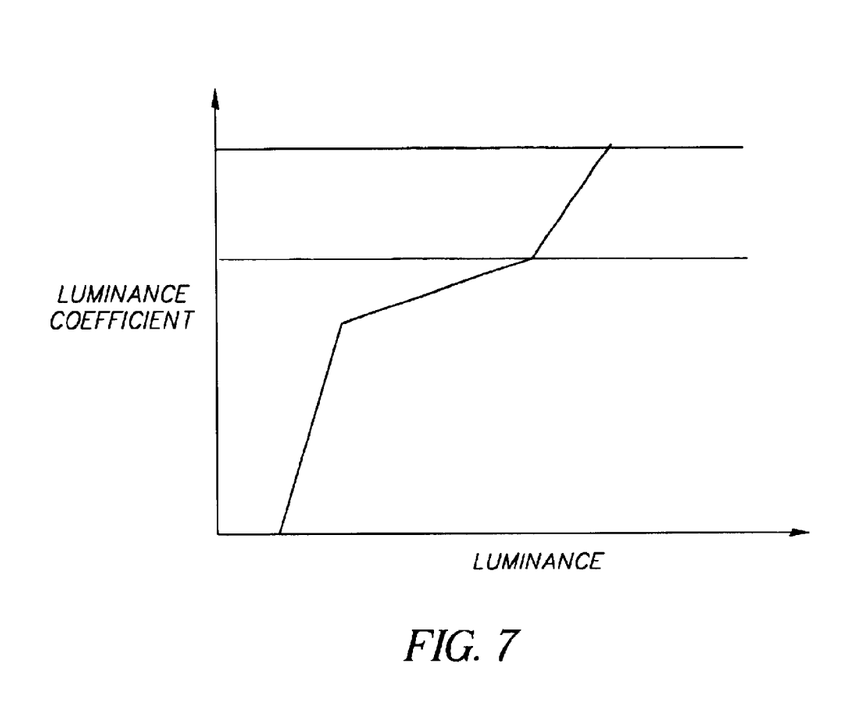
FIG. 7 illustrates an exemplary function for determining a luminance coefficient.

FIG. 7 illustrates an example of the function gj. The function gj is a function of the luminance Li, which in this example allows the coefficient Cl to become larger accordingly as the luminance increases. This takes into consideration the fact that a brighter object may be influenced more by the light source. By rendering this function into a function varying continuously with respect to the luminance, it is possible to smooth the influence of the block luminance Li upon the white balance. This will contribute to a stabilized white balance behavior. It is to be noted that each light source j has different luminance coefficient characteristics. The luminance coefficient function gj for each light source is previously obtained from experiment, for example, and is stored in the apparatus.

The block reliability calculating circuit 110 then multiplies the color difference based reliability Rd with the luminance coefficient Cl to find a reliability Rij. The reliability Rij is a value indicative of a possibility that the block i will be lighted by the light source j from the viewpoint of both the color difference and the luminance. That is, the reliability Rij is given as $$Rij = Clij * Rdij \quad (5)$$

For each light source j, the block reliability calculating circuit 110 executes the above processing operations on all the blocks i within the image.

Information on the thus obtained reliability Rij is entered into the reliability modifying circuit 112.

Figure 8:
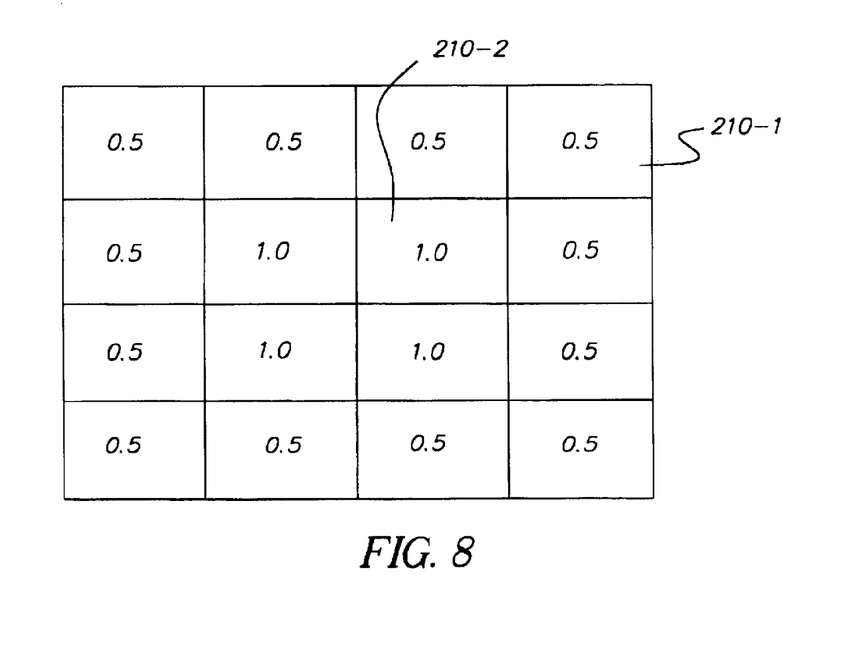
FIG. 8 is a diagram depicting the setting of position coefficients by way of example.

After the estimation of the reliability Rij, the reliability modifying circuit 112 modifies that reliability (S16). This circuit 112 allows the reliability Rij of the light source j for the block i to be corrected by use of the aforementioned variance coefficient Cvi and saturation coefficient Csi for that block i as well as of a position coefficient Cpi which is determined depending on the position of that block within the entire image. To be concrete, the reliability Rij is multiplied by those coefficients in order to modify the reliability. Let Rmij represent the thus modified reliability, then $$Rmij = Cvi * Cli * Cpi * Rij \quad (6)$$

where the position coefficient Cpi is a predetermined value which increases accordingly as the block i comes closer to the center of the image. This is due to the fact that a block closer to the image center is in general considered to have a higher importance within the image. A larger position coefficient is imparted to a block with a higher positional importance so that the color of the block with a higher importance can reflect more strongly on the white balance control. FIG. 8 illustrates an example of setting of the position coefficients. In this example, a position coefficient 1 is imparted to a block 210-1 at the center of the image, and a position coefficient 0.5 is imparted to a block 210-2 at the periphery of the image. These position coefficients are previously stored in the apparatus.

This modification processing further takes into consideration the variance coefficients Cvi and the saturation coefficients Csi as well. This carries a significance which follows.

First, the variance coefficient Cvi as discussed hereinabove is defined so as to have a smaller value accordingly as the variance of the pixel values within the block i increases. Thus, a larger variance of the block i leads to a smaller variance coefficient Cvi, with the result that the value of the modified reliability Rmij also becomes small. The reason for such a modification is that a larger variance of the pixel values of a block i is considered to result in a less dependable reliability Rij obtained from the representative color (Li, ui, vi) of that block. Since a larger variance leads to a greater dispersion of pixel values of that block, it is envisaged that the representative color derived from those pixel values may not reflect the tendency of the color of that block (that is, the tendency of the lighting). Therefore, the reliability Rij derived from such a less dependable representative color is considered to lack dependability, so that the value of the variance coefficient Cvi is diminished for the purpose of reducing the influence of that reliability Rij upon the white balance.

The saturation coefficient Csi, as described hereinabove, comes to have a smaller value accordingly as the number of the saturation pixels within the block i increases. In other words, the larger the number of saturation pixels within the block i is, the smaller the saturation coefficient Csi becomes, allowing the reliability Rij to be modified into a smaller value. The reason for such a modification is that the larger the number of the saturation pixels of the block i is, the lower the dependability of the reliability itself derived from the representative color (Li, ui, vi) of that block will become. Since the saturation pixels may possibly have the RGB components whose portions exceeding their respective upper limits have been cut off, there is a fear that the correct color of an object may not be well reflected. It is thus envisaged that the more saturation pixels will result in a reduced possibility that the representative color of a block reflects a tendency of the color of that block (therefore the tendency of the lighting). Due to the consideration that the reliability Rij obtained from such a less reliable representative color will have in itself a low dependability, a smaller value is herein imparted to the saturation coefficient Csi with the aim of reducing the influence of that reliability Rij upon the white balance.

In S16 the above reliability modifying processing is executed for each block i and for each light source j. The resultant modified reliability Rmij is entered into the light source contribution calculating circuit 114 as well as a total reliability calculating circuit 116.

After the acquisition of the modified reliability Rmij about all the blocks, estimation is made of the reliability of each light source j with respect to the entire image scene and of components of contribution of each light source j to the entire image (S18).

The reliability (referred to as total reliability) of the light source j upon the entire image is derived by the total reliability calculating circuit 116. The circuit 116 totals up the modified reliabilities Rmij of all the blocks i within the image to obtain the total reliability Rtij. That is, $$Rtij = \Sigma Rmij \quad (7)$$

where $\Sigma$ means the sum total of i=1~n (n is the total number of blocks).

The light source contribution components are derived by the light source contribution calculating circuit 114. The light source contribution components of the light source j refer to the influence each light source j exerts on the tone of the entire image, in other words, the tendency of the color which will appear on that image when that light source j lights up the scene of that image. The light source contribution components are represented by the combination of the luminance and the color difference. Herein, the components of contribution of the light source j upon the entire image are represented as (Lcj, ucj, vcj).

Based on the modified reliability Rmij for each block and for each light source, the representative color (Li, ui, vi) of each block and the total reliability Rtj of each light source, the light source contribution calculating circuit 116 estimates the light source contribution components using $$Lcj = (\Sigma Rmij \cdot Li)/Rtj$$

$$ucj = (\Sigma Rmij \cdot ui)/Rtj$$

$$vcj = (\Sigma Rmij \cdot vi)/Rtj \tag{8}$$

where $\Sigma$ means the sum total of i=1~n (n is the total number of blocks). This calculation is equivalent to the processing in which the luminances and color differences of all the blocks i are weighted and averaged by use of the modified reliability Rmij of each block i.

After the components of contribution of each light source j upon the entire scene of that image have been estimated in this way, a light source contribution modifying circuit 118 modifies the thus estimated values (S20). This modification includes roughly two steps.

In the first step, the components of contribution of each light source j are weighted and averaged with a standard color previously defined for each light source j. The standard color of the light source j is a standard color (i.e., combination of luminance and color difference) of a scene under lighting of the light source j and is obtained by producing images of various scenes with that light source j in advance and aggregating the luminances and color differences of the thus produced images. The standard color (Lsj, usj, vsj) of each light source j is previously stored in the apparatus. This modification processing in the first step is represented as $$Lmj = wsj \cdot Lcj + (1-wsj) \cdot Lsj$$

$$umj = wsj \cdot ucj + (1-wsj) \cdot usj$$

$$vmj = wsj \cdot vcj + (1-wsj) \cdot vsj \tag{9}$$

where (Lmj, umj, vmj) is the result of modification of the contribution components, and wsj ($0 \leq wsj \leq 1$) is a predetermined weight. The weight wsj is previously determined from experiment, for example, for each light source j, and is stored in the apparatus.

The first modification step is a modification intended to reduce the influence of the object color contained in the light source contribution components (Lcj, ucj, vcj). Any color appearing in the image is influenced both by the color of illumination light (lighting color) from the light source and by the color of the object itself ("object color"). The white balance is to correct the color in order to ensure that a white object looks white in response to the color temperature of the illumination light. Thus, if accurate estimation of the color of illumination light is achieved, a precise white balancing control will be feasible. However most actual images are images of scenes containing a number of objects of colors other than white, with the result that any influence of the object colors can inevitably reside in the colors of the images. The light source contribution components are thus weighted and averaged with the standard color of that light source j so that the influence of the object colors contained in the light source contribution components can be relatively reduced, whereby the light contribution components can be modified into values closer to the lighting color.

In the second step, the result (Lmj, umj, vmj) of the first modification step are subjected to another modification taking the subject luminance into consideration. The subject luminance Lo is detected by a subject luminance detector 30 provided in the camera. In this second modification step, the modifying circuit 118 first determines a modification coefficient Coj for each light source j. The modification coefficient Coj is determined by applying the subject luminance Lo to a function hj prepared for each light source j. That is, $$Coj = hj(Lo) \tag{10}$$

Figure 9:
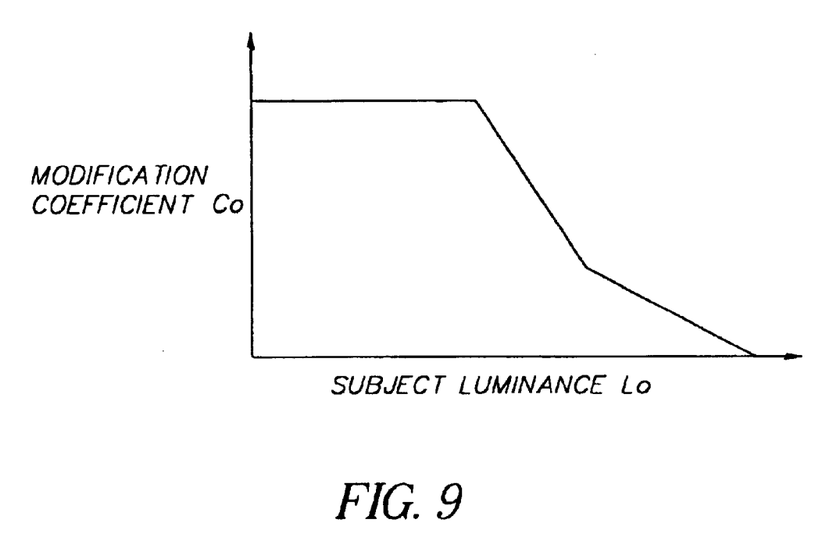
FIG. 9 illustrates an exemplary function for determining a modification coefficient based on the luminance of a subject.

FIG. 9 illustrates by way of example the modification function hj based on the subject luminance. In this example, the modification coefficient Co becomes smaller accordingly as the subject luminance Lo increases, with the modification coefficient resulting in 0 when the subject luminance exceeds a certain value. This is an example of the function hj when the light source is a fluorescent light. In the event of a scene photographed under the illumination of the fluorescent light, the subject will be dark compared with the case where the scene is an outdoor scene in the daytime. Provided that the subject luminance is extremely high, there will be a strong possibility of the image being one of an outdoor scene, with a weak possibility of it being one under fluorescent lighting. Thus, in the case of the fluorescent light source, the higher the subject luminance becomes, the smaller value the modification coefficient Co has. In the case of a scene under tungsten light or shade-light as well, the function hj is used which allows the modification coefficient Co to become smaller when the subject luminance exceeds a certain value, since the subject luminance will be lower than the daylight scene. These modification functions hj are previously determined from experiment for example and are stored in the apparatus.

The light source contribution modifying circuit 118 then multiplies the first step modification result (Lmj, umj, vmj) with the thus determined modification coefficient Co to obtain final modification result (Lzj, uzj, vzj). That is, $$Lzj = Coj \cdot Lmj$$

$$uzj = Coj \cdot umj$$

$$vzj = Coj \cdot vmj \tag{11}$$

The modification result (Lzj, uzj, vzj) represents light source contribution components modified in view of parameters such as the subject luminance. This modification result is entered into a lighting color estimating circuit 120.

The lighting color estimating circuit 120 estimates the color of lighting (lighting color) which lights up scenes of the image to be photographed, on the basis of the modification result (Lzj, uzj, vzj) of the light source contribution components of each light source j fed from the light source contribution modifying circuit 118, and of the total reliability Rtj of each light source j for the entire scene obtained by the total reliability calculating circuit 116 (S22). This estimation is effected by weighting and averaging the modification results (Lzj, uzj, vzj) of the light source contribution components by using the total reliability Rtj of each light source j as the weight assumed over all the light sources. That is, let (IL, Iu, Iv) represent the lighting color, then $$Wj = Rtj/(\Sigma Rtj)$$

$$IL = \Sigma(Wj*Lzj)$$

$$Iu = \Sigma(Wj*uzj)$$

$$Iv = \Sigma(Wj*vzj) \tag{12}$$

where $\Sigma$ means the sum total of all the light sources j assumed.

In other words, on the supposition that scenes are lighted by those assumed light sources in a composite manner, S22 allows the estimation of the lighting color of the composite lighting by use of the weighted averaging. This lighting color corresponds to the color of a white object under the composite lighting. The resultant lighting color (IL, Iu, Iv) is entered into a white balance gain calculating circuit 122.

From accepted information on the lighting color (IL, Iu, Iv), the white balance gain calculating circuit 122 derives gains (Rgain, Ggain, Bgain) for the white balance control (S24). This calculation is carried out using the following expressions.

[Expression 13]

$$\begin{pmatrix} IR \\ IG \\ IB \end{pmatrix} = \begin{pmatrix} 1 & -1 & -1 \\ 1 & 1 & 0 \\ 1 & -1 & 1 \end{pmatrix} \begin{pmatrix} IL \\ Iu \\ Iv \end{pmatrix} \quad (13)$$

$$I_{Max} = \max(IR, IG, IB) \quad (14)$$

$$Rgain = I_{Max}/IR$$

$$Ggain = I_{Max}/IG$$

$$Bgain = I_{Max}/IB \quad (15)$$

(IR, IG, IB) is a RGB representation of the lighting color. The resultant white balance gains (Rgain, Ggain, Bgain) are values for correcting the color (i.e., (IR, IG, IB) in itself) obtained when the lighting of this color is reflected on a white object, into gray (i.e., R=G=B). The thus obtained white balance gains are entered into a white balance adjusting circuit 124.

The white balance adjusting circuit 124 multiplies pixel values R, G and B of an image fed from the imaging device 20 by the gains Rgain, Ggain and Bgain, respectively, obtained by the white balance gain calculating circuit 122, to regulate the white balance of the image (S26). The auto white balancing apparatus thus provides, through its output terminal 126, outputs (Rout, Gout, Bout) given by the following expressions:

$$Rout = Rgain * R$$

$$Gout = Ggain * G$$

$$Bout = Bgain * B \quad (16)$$

The preferred embodiment of the present invention has thus been described.

On the basis of the distance between the representative color of each block and the typical color difference of each light source, as set forth hereinabove, this embodiment estimates a reliability with which each block is lighted by each light source to thereby provide a white balance adjustment based on the reliability. By virtue of the acquisition of the reliability from a continuous function with respect to the distance, a more stabilized behavior can be achieved in the white balance control, compared with the prior art making the white balance adjustment based on the results of binary discrimination of whether each block is contained in a range corresponding to each light source.

Furthermore, by virtue of the modification of the color difference based reliability in response to the luminance of the block representative color, this embodiment is capable of providing a white balance control incorporating knowledge about the influence of each assumed light source upon the luminance of scenes.

This modification in response to the luminance is effected depending on a continuous function with respect to the luminance, whereupon another advantage ensuring a smooth white balance control is provided.

Due to the provision of a correction mechanism for rendering the reliability smaller accordingly as the variance of pixel values within a block becomes larger, this embodiment is also capable of reducing any influence that blocks having largely dispersed pixel values (that is, with a reduced possibility that they represent the color of the illumination light) will exert on the white balance control.

Due to the provision of a correction mechanism for rendering the reliability smaller accordingly as the number of saturation pixels within a block increases, this embodiment is also capable of reducing any influence that blocks having a large number of saturation pixels (that is, with a possibility that the pixel values may not represent the proper color) will exert on the white balance control.

Due to the provision of a mechanism for adjusting the white balance in response to the subject luminance using the knowledge about the relationship between the light source and the subject luminance, this embodiment is also capable of providing a more appropriate white balance control.

Although in the above embodiment the reliability obtained from the color difference of the block representative color has been modified in accordance with the luminance of the representative color, the variance of pixel values within the block, the number of saturation pixels within the block, and the position of the block within the image, a certain improvement to the prior art could be achieved even though the white balance control has been effected using the reliability free from such a modification. The degree of improvement is enhanced by subjecting this color difference based reliability to the above modification items. Modifications with respect to more items will then realize a higher accuracy in the white balance control.

The invention has been described in detail with particular reference to certain preferred embodiments thereof, but it will be understood that variations and modifications can be effected within the spirit and scope of the invention.

PARTS LIST

FIG. 1
10 auto white balancing apparatus
20 imaging device
30 subject luminance detector
102 block split circuit
104 representative color calculating circuit
106 variance coefficient calculating circuit
108 saturation coefficient calculating circuit
110 block reliability calculating circuit
112 reliability modifying circuit
114 light source contribution calculating circuit
116 total reliability calculating circuit
118 light source contribution modifying circuit
120 lighting color estimating circuit
122 white balance gain calculating circuit
124 white balance adjusting circuit FIG. 2
1 start
2 end
s10 split into blocks
s12 calculate representative color
s14 assume block reliability
s16 modify block reliability
s18 calculate total reliability and components of contribution of each light source
s20 modify light source contribution components
s22 estimate lighting color
s24 calculate white balance gain
s26 adjust white balance FIG. 3
200 image
210 block
FIG. 4
1 variance coefficient
2 variance
FIG. 5
1 saturation coefficient
2 number of saturated pixels
FIG. 6
1 reliability
2 distance
FIG. 7
1 luminance coefficient
2 luminance
FIG. 8
210-1 block
210-2 block
FIG. 9
1 modification coefficient co
2 subject luminance Lo

What is claimed is:

1. An auto white balancing apparatus comprising:
    (a) a block split circuit for splitting an image into a plurality of blocks;
    (b) a representative color calculating circuit which for each split block, derives a representative color of each block on the basis of pixel values within each block;
    (c) a block reliability estimating circuit which for each block determines the distance between color difference components of the color of a white object under at least one light source and color difference components of the representative color of each block, to thereby estimate a reliability signal with which the at least one light source lights a scene of each block on the basis of the distances;
    (d) a circuit for determining the variance of pixel values of pixels sampled from the block;
    (e) a circuit for modifying the reliability signal estimated by the block reliability estimating circuit, in accordance with a predetermined function whose value becomes smaller as the variance of the pixel values increases;
    (f) a lighting color estimating circuit for estimating the color of lighting which lights the scene of the entire image in response to the modified reliability signals; and
    (g) a white balancing circuit for executing white balance processing of each pixel of the image so as to cancel the estimated lighting color.

2. An auto white balancing apparatus comprising:
    (a) a block split circuit for splitting an image into a plurality of blocks;
    (b) a representative color calculating circuit which for each split block, derives a representative color of each block on the basis of pixel values within each block;
    (c) a block reliability estimating circuit which for each block determines the distance between color difference components of the color of a white object under at least one light source and color difference components of the representative color of each block, to thereby estimate a reliability signal with which the at least one light source lights a scene of each block on the basis of the distances;
    (d) a circuit for counting up the number of saturation pixels contained in the block; and
    (e) a circuit for modifying the reliability signal estimated by the block reliability estimating circuit, in accordance with a predetermined function whose value becomes smaller as the number of the saturation pixels increases;
    (f) a lighting color estimating circuit for estimating the color of lighting which lights the scene of the entire image in response to the modified reliability signals; and
    (g) a white balancing circuit for executing white balance processing of each pixel of the image so as to cancel the estimated lighting color.

3. A method of performing auto white balancing adjustment for an image, comprising:
    (a) splitting an image to be subjected to white balance processing into a plurality of blocks;
    (b) for each split block, deriving a representative color of each block on the basis of pixel values within each block;
    (c) for each block and for at least one light source, determining the distance between color difference components of the color of a white object under the at least one light source and color difference components of the representative color of each block, to thereby estimate a reliability signal with which the at least one light source lights a scene of each block on the basis of the distances;
    (d) determining the variance of pixel values of pixels sampled from the block;
    (e) modifying the reliability signal in accordance with a predetermined function whose value becomes smaller as the variance of the pixel values increases;
    (f) estimating the color of lighting which lights the scene of the entire image in response to the modified reliability signal; and
    (g) executing white balance processing for each pixel of the image so as to cancel the estimated lighting color.

4. A method of performing auto white balancing adjustment for an image, comprising:
    (a) splitting an image to be subjected to white balance processing into a plurality of blocks;
    (b) for each split block, deriving a representative color of each block on the basis of pixel values within each block;
    (c) for each block and for at least one light source, determining the distance between color difference components of the color of a white object under the at least one light source and color difference components of the representative color of each block, to thereby estimate a reliability signal with which the at least one light source lights a scene of each block on the basis of the distances;
    (d) counting up the number of saturation pixels contained in the block;
    (e) modifying the reliability signal in accordance with a predetermined function whose value becomes smaller as the number of the saturation pixels increases;
    (f) estimating the color of lighting which lights the scene of the entire image in response to the modified reliability signal; and
    (g) executing white balance processing for each pixel of the image so as to cancel the estimated lighting color.

* * * * *